(12) United States Patent
Ohm

(10) Patent No.: US 9,068,688 B2
(45) Date of Patent: Jun. 30, 2015

(54) HANGING SYSTEMS

(76) Inventor: Bob Ohm, Prescott, AZ (US)

( * ) Notice: Subject to any disclaimer, the term of this patent is extended or adjusted under 35 U.S.C. 154(b) by 504 days.

(21) Appl. No.: 12/833,934

(22) Filed: Jul. 9, 2010

(65) Prior Publication Data

US 2012/0006954 A1 Jan. 12, 2012

(51) Int. Cl.
*A47G 1/16* (2006.01)
*F16M 13/02* (2006.01)

(52) U.S. Cl.
CPC ............ *F16M 13/025* (2013.01); *A47G 1/1653* (2013.01)

(58) Field of Classification Search
CPC ....... F16M 13/02; F16M 13/025; A47G 1/16; A47G 1/1653
USPC ........ 248/220.1, 475.1, 201, 219.1, 534, 536, 248/538, 248, 250, 37.6, 242, 298.1, 489; D8/354, 355, 366, 367; D6/556; 40/745, 758; 428/542.1
See application file for complete search history.

(56) References Cited

U.S. PATENT DOCUMENTS

| 505,230 | A | | 9/1893 | Robinson | |
|---|---|---|---|---|---|
| 1,219,596 | A | | 3/1917 | Simmons | |
| 1,595,643 | A | * | 8/1926 | Clark | 248/220.1 |
| 4,032,242 | A | * | 6/1977 | Morris | 403/231 |
| 4,049,225 | A | * | 9/1977 | Chasen et al. | 248/219.4 |
| 4,151,971 | A | * | 5/1979 | Daly et al. | 248/286.1 |
| 5,042,766 | A | | 8/1991 | Baker | |
| 5,094,421 | A | | 3/1992 | Zaccone | |
| 5,154,384 | A | | 10/1992 | Owens | |
| 5,257,766 | A | * | 11/1993 | Riblet | 248/248 |
| 5,372,488 | A | * | 12/1994 | Turner | 417/554 |
| 5,810,317 | A | | 9/1998 | Macchi | |
| 5,865,410 | A | * | 2/1999 | Horen | 248/242 |
| 6,015,123 | A | | 1/2000 | Perez et al. | |
| 6,364,261 | B1 | * | 4/2002 | Vass, Jr. | 248/220.1 |
| 7,226,027 | B1 | | 6/2007 | Feeley | |
| D608,183 | S | * | 1/2010 | Meyer et al. | D8/354 |
| 7,857,779 | B2 | * | 12/2010 | Gondringer | 602/33 |
| 7,883,066 | B2 | * | 2/2011 | Wiese | 248/220.1 |
| D653,524 | S | * | 2/2012 | Meyer | D8/354 |
| 2008/0217496 | A1 | | 9/2008 | Wooten | |
| 2009/0313843 | A1 | | 12/2009 | Compton | |
| 2012/0006954 | A1 | * | 1/2012 | Ohm | 248/220.1 |

FOREIGN PATENT DOCUMENTS

DE 3914516 A1 11/1990
FR 2872689 A1 1/2006

* cited by examiner

*Primary Examiner* — Tan Le
(74) *Attorney, Agent, or Firm* — Andrew P Lahser

(57) ABSTRACT

A hanger arrangement is disclosed to support an object in the corner of a room. It includes a bracket with a corner portion to form to the walls of the inside corner of a room. The bracket includes a cantilever portion to support the object. The joint angle between the cantilever portion and corner portion is between 45 and 82 degrees. Additional embodiments are disclosed related to the L-shaped profile of the cantilever and its hook adaptations to hold the object.

14 Claims, 6 Drawing Sheets

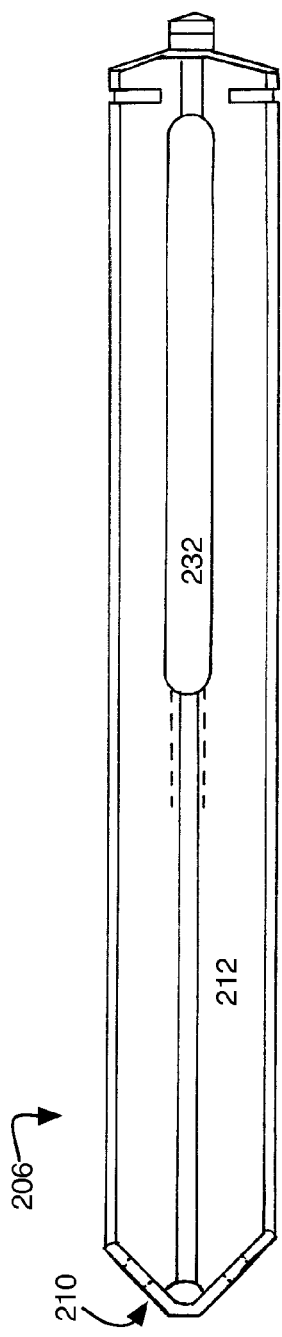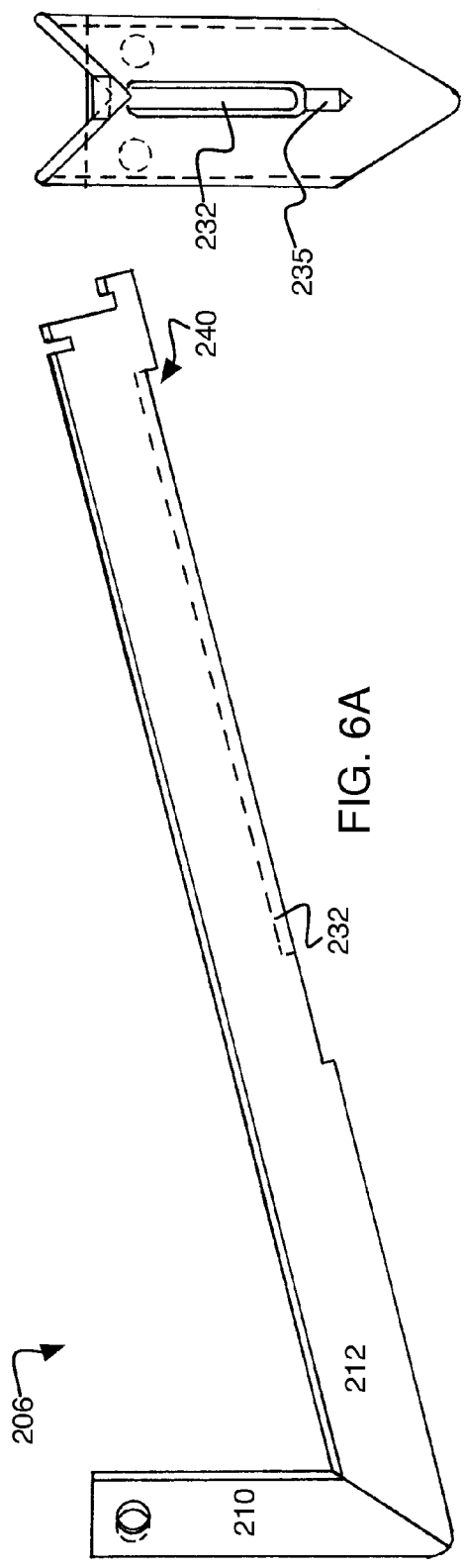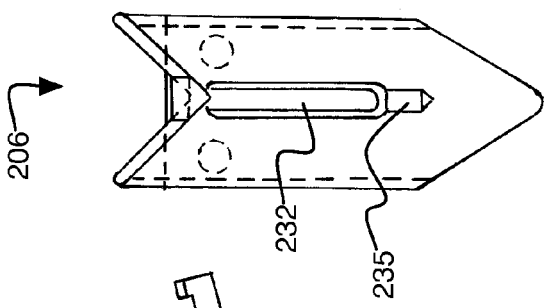

HANGING SYSTEMS

CROSS REFERENCE TO RELATED APPLICATIONS

Not applicable.

BRIEF DESCRIPTION OF THE DRAWINGS

FIG. 6A shows a side view, FIG. 6B shows a top view, and FIG. 6C shows a front view, all illustrating an alternate bracket including the angle of the joint, the L-shaped cross section, and the predetermined length of the cantilever portion selected for a specific sized object.

DETAILED DESCRIPTION

The present Hanging Systems will now be discussed in detail with regard to the attached drawing figures, which were briefly described above. In the following description, numerous specific details are set forth illustrating the Applicant's best mode for practicing the Hanging Systems and enabling one of ordinary skill in the art to make and use the Hanging Systems. It will be obvious, however, to one skilled in the art that the present Hanging Systems may be practiced without many of these specific details. In other instances, well-known manufacturing techniques, materials selection, design choices, and other method steps have not been described in particular detail in order to avoid unnecessarily obscuring this disclosure.

Figure 1:
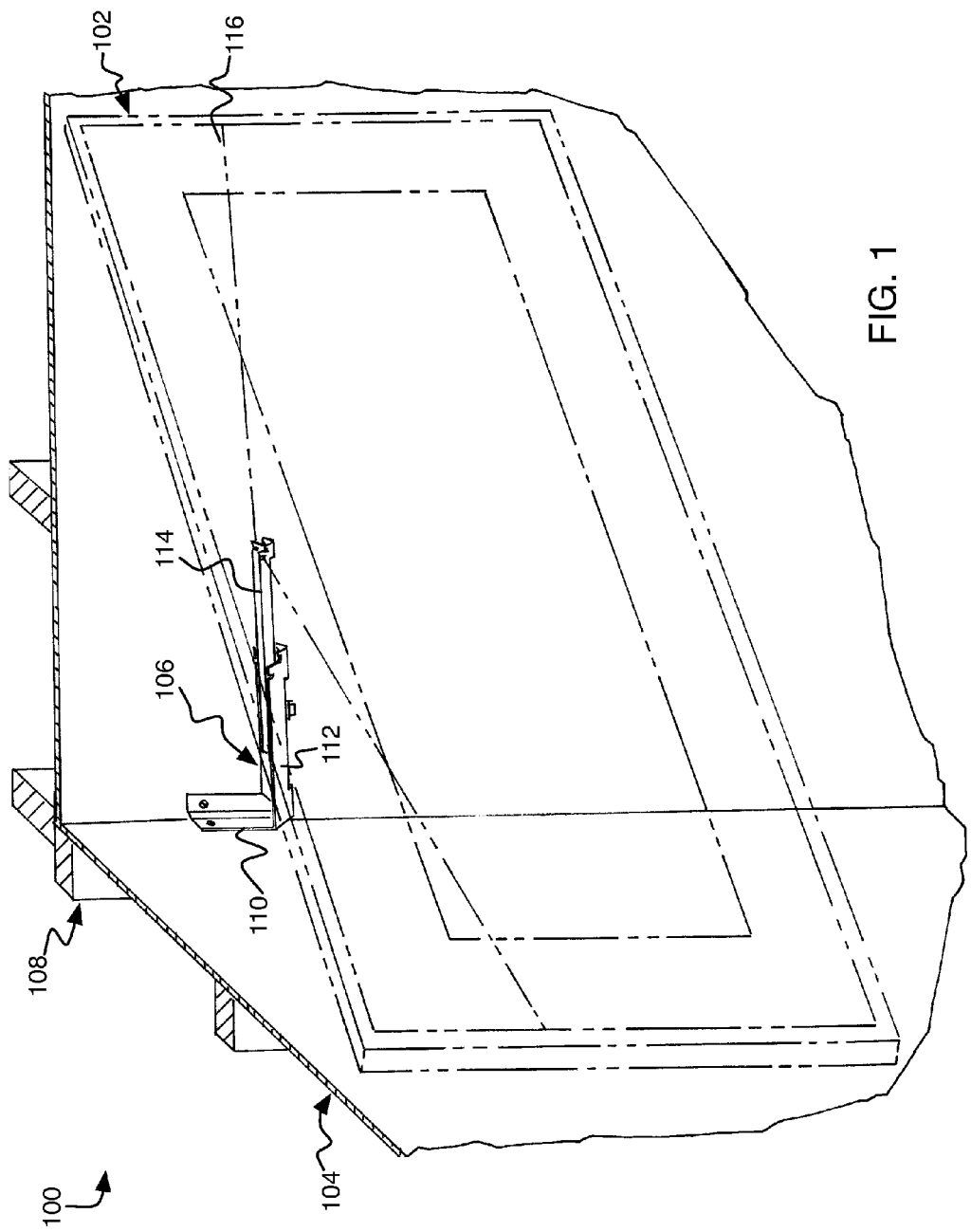
FIG. 1 shows a perspective view illustrating a picture frame displayed in a corner of a room by mounting upon a hanger arrangement.

FIG. 1 shows a perspective view illustrating a picture frame 102 displayed in a corner of a room by mounting upon a hanger arrangement 100. Hanger arrangement 100 allows installation of mounting hardware in a simple, convenient, and handy manner. Hanger arrangement 100 includes optimization of the support strength and hanging capacity for the object balanced against the overall weight of the bracket 106 and other mounting hardware. Hanger arrangement 100 includes simple installation steps. Hanger arrangement 100 provides concealment for the mounting hardware after display of the object in the corner.

Picture frame 102 is displayed in the corner room. Picture frame 102 is attached to a picture frame wire 116, as shown. Picture frame wire 116 hangs from hooks at the distal end of bracket 106, more specifically the extension member 114. Alternately, (not shown), picture frame wire may hang from hooks at the distal end of bracket 106. Bracket 106 is affixed to the corner of the room using fasteners (which are more clearly illustrated in FIG. 3). Depending on the size and dimensions of picture frame 102, extension member 114 may be adjusted to a length sufficient to allow picture frame 102 to hang in the space between the two walls 104.

The picture frame may be any type of decorative object, for example, picture frames, plaques, ornaments, rugs, or other decorations suitable for hanging on walls.

Figure 2:
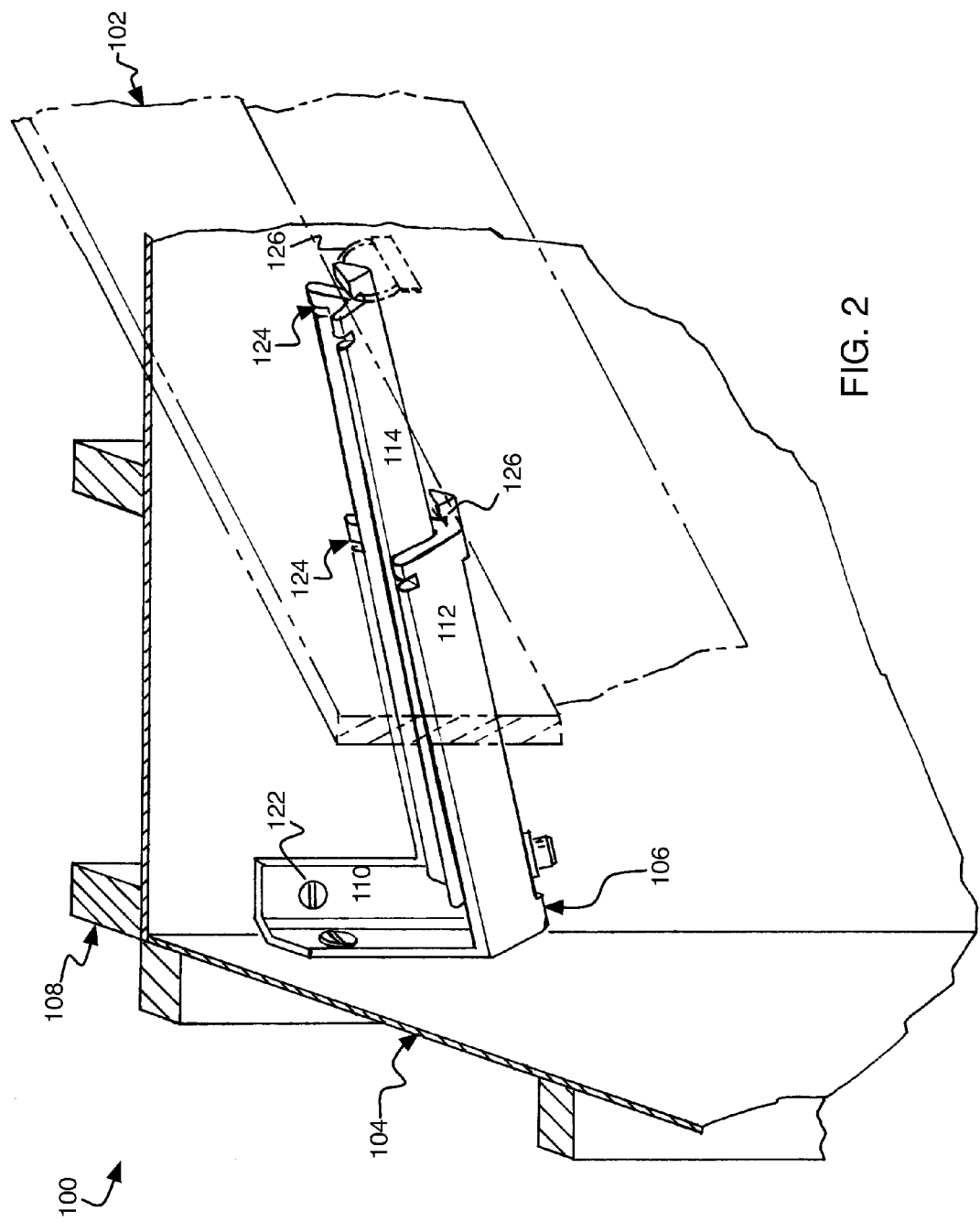
FIG. 2 shows a perspective view illustrating another picture frame that will be hung from a solid hoop from a hanger arrangement after completion of installation.

FIG. 2 shows a perspective view illustrating another picture frame 102 that will be hung from a solid hoop from a hanger arrangement after completion of installation. To install the bracket 106, a few steps would need to be employed. First, the installer would select a hanging height at the corner of the room. Second, the installer would hold the bracket 106, in the corner with one hand while screwing in screws 122 with the other hand.

After both screws 122 are in position, the installer would decide whether or not the extension member 114 would be necessary or desirable for the installation. Third, the extension member 114 may be optionally positioned to allow the picture frame to freely hang without obstruction from walls 104. Extension member 114 would be securely held in place using locking screw 136 (more clearly shown and described at FIG. 5).

Finally, the picture would be disposed upon the hooks at the distal end of the bracket 106. The hook or hooks used may be selected by the installer depending on the picture frame. For example, if the picture frame has a solid loop hook (as shown in FIG. 2), the hook near the apex of the bracket 106 or extension member 114 may be used. Alternately, the installer may choose to use the hooks positioned at the top of the flanges of the L-shaped cross section when the picture frame will be suspended with picture frame wire or other flexible means of attachment.

Figure 3:
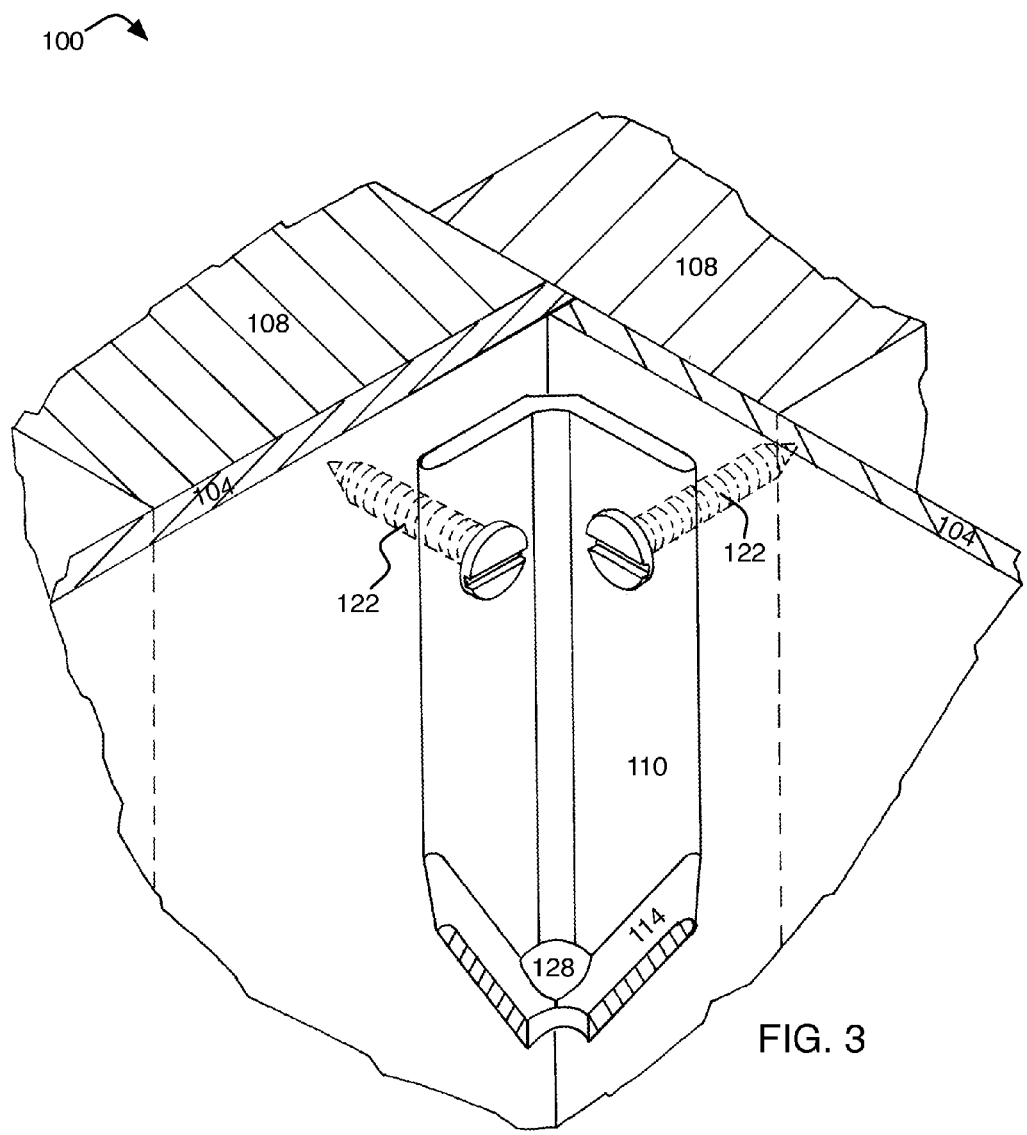
FIG. 3 shows a perspective view illustrating the portion that forms to the corner of the room mounted by two fasteners to both walls of the inside corner of the room.

FIG. 3 shows a perspective view illustrating the portion of bracket 106 that forms to the corner of the room mounted by two fasteners to both walls 104 of the inside corner of the room. This figure shows the screws 122 disposed in the attachment holes 130 (See FIG. 4) of bracket 106. The screws 122 have been screwed into walls 104, as shown. In most framed buildings, the corner will have two wall studs 108 in the corner, as shown. Sometimes, there will not be a wall stud directly into the diagonal corner of the room, rather this area might be void of structure. The arrangement, position and spacing of the attachment holes 130, and thereby, the screws 122, may be selected to engage the wall studs 108 when placed in a building that exhibits typical framed building construction. Since most wall studs come in standard dimensions, the attachment holes may be positioned to engage the center portion of the wall stud. Alternately, the attachment holes may be positioned to engage any portion of the wall stud but allow for adequate clearance for a screwdriver, hand, or other tool while positioning, engaging or screwing in the fasteners.

The engagement of the screws 122 with wall studs 108 allows bracket 106 to support heavier loads than without such engagement.

Attachment and mounting may be by any arrangement or means for attaching hardware to walls, wall studs or corners, such as, for example, screws and holes, nails, pegs, spikes and other types of fasteners.

Also, this figure shows a perspective view of the joint between corner portion 110 of bracket 106 and cantilever portion 112. Weld 128 shows were the two portions form the desired angle of bracket 106. (See FIG. 4 for further discussion of selection of the angle).

Figure 4C:
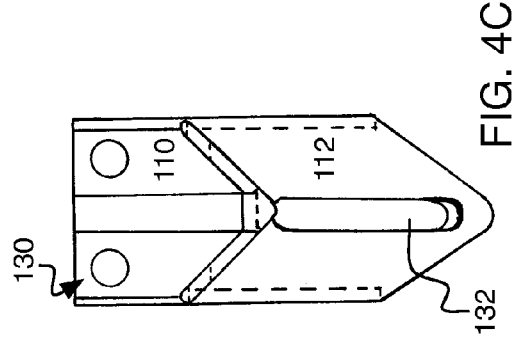
FIG. 4C shows a front view, all illustrating the bracket including the angle of the joint, the L-shaped cross section and the mounting holes.
Figure 4B:
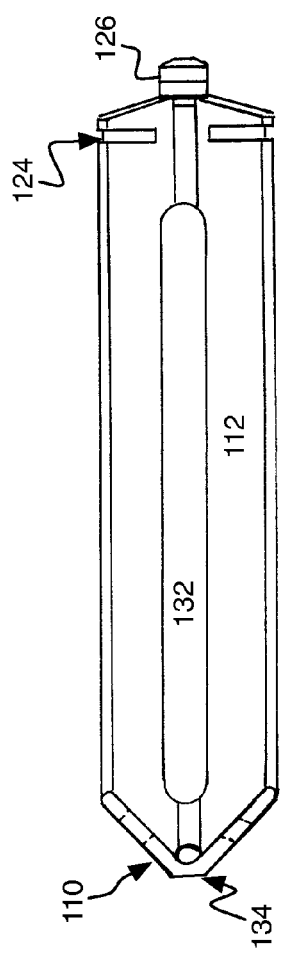
FIG. 4B shows a top view.
Figure 4A:
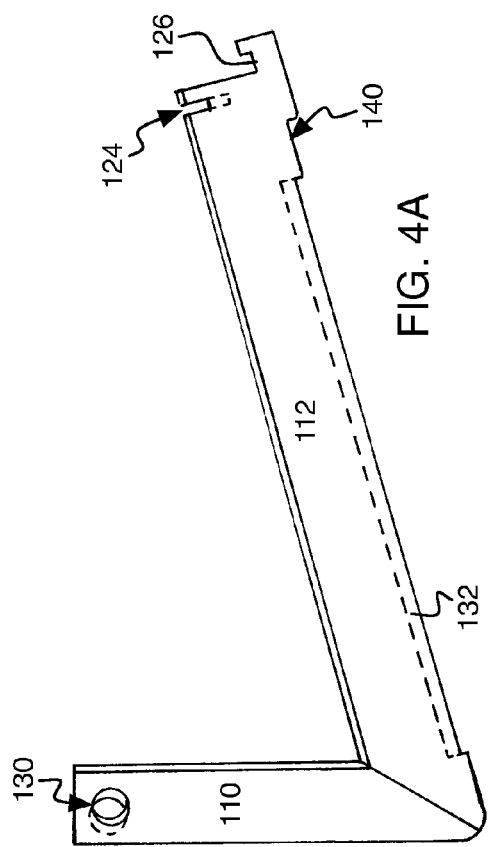
FIG. 4A shows a side view.

FIG. 4A shows a side view, FIG. 4B shows a top view, and FIG. 4C shows a front view, all illustrating bracket 106 including the angle of the joint, the L-shaped cross section and the attachment holes 130.

Bracket 106 may be constructed out of hot rolled bar angle. Hot rolled bar angle typically has a L-shaped cross section, as shown. Other materials may be used, for example, sheet metal, which may be less expensive. Hot rolled bar angle does not need further bending or stamping, so there would be no loss in material strength along the apex of the L-shaped cross section during the later steps of manufacture. Other types of materials were tested, however, they may result in increased costs or decreased strength to weight ratios.

When the corner portion 110 and the cantilever portion 112 are joined at an angle, the structures support each other, in a manner similar to a truss, that is, deformation of either portion would require deformation of the other portion. This arrangement may increase overall strength.

The angle of the joint between the cantilever portion 112 and the corner portion 110 may be selected to accomplish several design objectives. The angle determines the ratio of pulling forces to shearing forces that are exerted on screws 122. The angle determines the rise of the object relative to the mounting position on the wall, which helps to conceal bracket 106 and other mounting hardware. The angle and cantilever length together determines the final distance at with the object may hang from the corner. With an extension member, this final minimum distance may be lengthened to a maximum dimension nearly double the length. Finally, the angle helps determine the amount of support provided at the distal side of the bracket and the maximum weight of the object supported. Inventor's testing showed that the smaller bracket (shown in FIG. 4) with an extension arm in the fully extended position was capable of supporting a weight of 50 pounds (22.68 kilograms). The angle may be about 75 degrees or 77 degrees. In some embodiments, the angle may range from 65 to 82 degrees. In other embodiments, the angle may be 45 to 65 degrees. By joining the cantilever portion to the bottom side of the corner portion, the upward and outward angle will help to accomplish these various design objectives.

The joint of the angle may be by any angling means or structural joining, for example, varying degrees of angle, welding, forming, stamping, etc.

Likewise, the length of the cantilever portion may be selected to accomplish similar objectives. The length of the cantilever helps geometrically determine the min and max horizontal size of the picture frame that may be displayed. The angle of the joint and the length of the cantilever portion may be predetermined to support popular frame sizes. That is, by selecting a particular popular frame, the minimum distance from the corner may be calculated along with an estimate for the weight of the frame. Using these estimates, a bracket may be constructed with the desired angle and length of cantilever to fit that size frame (without the use of an extension member).

Bracket 106 includes attachment holes 130, which have been placed near the top side of the corner portion 110. Attachment holes 130 may be positioned so that fasteners will engage wall studs 108 when the corner portion 110 is positioned in the corner of a framed room, as discussed in FIG. 3, above.

Corner portion 110 may be generally shaped like the letter "L" and fit into inside corners that are also L-shaped. The flanges of 110 may typically be the same size.

Corner portion 110 may include clearance 134 for the corner. Clearance 134 may be formed by shaving or reducing the apex of the L-shaped profile to prevent the corner portion 110 from touching the corner. Clearance 134 may prevent force from being applied to the corner. Clearance 134 may prevent damage to corner, for example, cracking of paint or stretching, tearing of wall paper, or damage to other types of wall finish. Clearance 134 may also allow for irregular corner surfaces.

The corner portion may be any corner forming means or arrangement for conforming to both walls of a corner simultaneously, for example, by using an L-shape, a V-shape, or other shape that may be typically used in the corner of a room.

Cantilever portion 112 may include apex slot 132 and locking nut relief area 140 for extension member 114, as shown. Apex slot 132 is a slot in the apex of cantilever portion 112 that allows for continuous positioning of extension member 114. Locking nut relief area 140 provides a flat section for the locking screw 136 to engage cantilever portion 112 and provide additional friction to prevent movement of the extension member 114 or locking screw 136 when the locking screw 136 is fully engaged.

The cantilever portion may be any cantilever means or structure to support an object while supported along one side, for example, an L-shape angle iron, a steel rod, a tube, or other members that are capable of such support.

The distal side of cantilever portion 112 provides hooks for hanging picture frames and objects. The top side of the cantilever arm provides two hooks 124 that may be suited for holding picture frame wire. By providing two hooks, this allows for superior side to side positioning compared to a single hook when using flexible picture frame wire, which can be known for its less precise nature. (See FIG. 1. for a rendering of engagement of a picture frame wire with the hooks). The bottom side of the cantilever arm, near the apex of the L-shaped profile, provides a single hook 126 that may be suited for holding solid loops. (See FIG. 2 for a rendering of engagement of a solid hoop with the hook.) By providing hook 126 at the bottom side, the solid loop may engage with the portion of bracket 106 that extends furthest from the corner. Hook 126 may be useful in engaging cardboard or steel loops and holes in the frame or picture backing. The inclusion of hooks 124 and hook 126 allow for bracket 106 to be used with or without extension member 114. Hooks may be any type of adaptations or means for holding picture frames, for example, flexible wire stays, studs, loops or portions thereof, fasteners, ledges, etc, which may form portions of circles, triangular or other shapes suitable for hanging objects.

With the use of hot rolled bar angle, the entire bracket may be constructed with a single joint, that is, the corner portion, the cantilever portion, clearances, reliefs, adaptations and hooks. All other features may be constructed through machining, which results in a monolithic, unitary, single and integral piece.

Figure 5C:
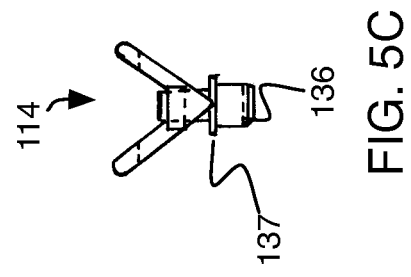
FIG. 5C shows a front view, all illustrating the extension member including the L-shaped cross section, the locking screw and the distal end mounting hooks.
Figure 5B:
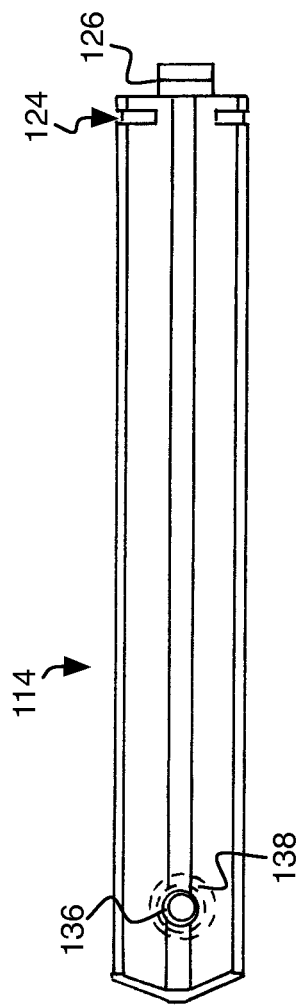
FIG. 5B shows a top view.
Figure 5A:
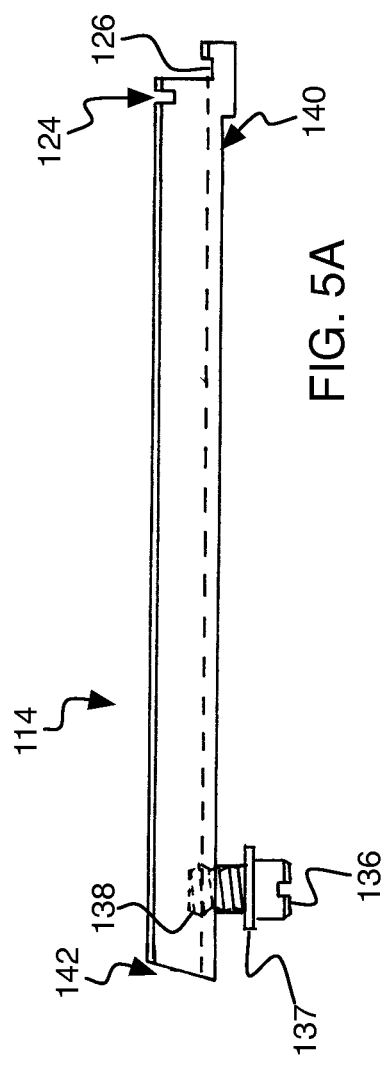
FIG. 5A shows a side view.

FIG. 5A shows a side view, FIG. 5B shows a top view, and FIG. 5C shows a front view, all illustrating the extension member 114 including the L-shaped cross section, locking screw 136 and the distal side mounting hooks. Extension member 114 may also be created from hot rolled angle bar, or other materials, similar to bracket 106, as shown. Extension member 114 may include an L-shaped profile. Extension member 114 may have hooks similar to the distal end of cantilever portion 112, including picture frame wire hooks 124 and loop hook 126, as shown.

Extension member 114 may be removably attached to bracket 106 by positioning the extension member 114 into the top side of cantilever portion 112 and inserting the locking screw 136 with washer 137 into the screw-threaded hole 138 through the bottom side of the cantilever portion 112, as shown in FIG. 1. The bottom of the apex of the L-shape of the extension member 114 may be shaved or relieved to form locking nut relief area 140. Locking nut relief area 140 allows the flanges of extension member 114 to rest more fully on the flanges of the cantilever portion 112, which may help produce more friction and prevent movement or slippage of the extension member 114.

Extension member 114 may be angled on the proximal side (the side closest to the corner portion 110) at an angle to allow the extension member 114 to fully recede into corner portion 110. Angle cut 142 allows extension member 114 a full range of adjustability from nearly the length of cantilever portion 112 to full extension, as shown.

FIG. 6A shows a side view, FIG. 6B shows a top view, and FIG. 6C shows a front view, all illustrating an alternate bracket including the angle of the joint, the L-shaped cross section, and the predetermined length of the cantilever portion selected for a specific sized object. In this embodiment, the cantilever portion has been extended to allow for larger picture frames. This embodiment may use the same extension member as the embodiment shown in FIG. 4. To support a larger picture frame, cantilever portion 212 has been lengthened. Apex slot 232 remains the same size, and, remains positioned near the distal end of cantilever portion 212. Locking nut relief 240 is positioned similarly with respect to apex slot 232, as shown. In this embodiment, the angle between corner portion 210 and cantilever portion 212 has been increased by several degrees. From the front view (FIG. 6C), it can be seen that the cantilever arm rises above the point of attachment (compare to FIG. 4C). This selection of angle and length of cantilever arm may be made to increase the concealment attributes at the expense of other attributes.

Although applicant has described applicant's best mode and other embodiments of the present Hanging Systems, it will be understood that the broadest scope of this invention includes such modifications as diverse application of technology, variance of method steps, choice of materials, selection of sizes and shapes, etc. Such scope is limited only by the below claims as read in connection with the above specification. Further, many other advantages of applicant's invention will be apparent to those skilled in the art from the detailed descriptions and the claims.

What is claimed is:

1. A hanger arrangement to support an object in the corner of a room comprising: a bracket, wherein the bracket comprises a corner portion to form to both walls of the inside corner of the room, wherein the corner portion has a bottom side, wherein the corner portion has an L-shaped cross section substantially perpendicular to its length, a cantilever portion to support the object, wherein the cantilever portion has an L-shaped cross section substantially perpendicular to its length, and a joint to angle the cantilever portion from the bottom side to the corner portion at an angle of 45 to 82 degrees upwardly and outwardly from the corner after attachment to the wall, wherein the joint substantially aligns the apex of the L-shaped sections of the corner portion and the cantilever portion, an adaptation to support an object positioned on the distal end of the cantilever portion; and a plurality of fasteners to allow fastening of the corner portion to both inside walls in the corner of the room.

2. The hanger arrangement of claim 1: wherein the joint comprises an angle of 65 to 82 degrees.

3. The hanger arrangement of claim 1: wherein the joint comprises an angle of 75 to 77 degrees.

4. The hanger arrangement of claim 1: wherein the arrangement does not comprise any gusset to further assist supporting the object between the corner portion and the cantilever portion.

5. The hanger arrangement of claim 1: wherein the corner portion and cantilever portion are a single, integral piece.

6. The hanger arrangement of claim 1: wherein corner portion further comprises sufficient clearance to prevent the apex of the L-shaped section from contacting the corner of the room.

7. The hanger arrangement of claim 1 further comprising: an extending member to extend the cantilever portion upwardly and outwardly from the corner forming means from about the length of the cantilever portion to almost double the length of the cantilever portion; adaptations to engage an object positioned on the distal end of the extending member.

8. The hanger arrangement of claim 1 further comprising: adaptations to support an object positioned on the distal end of the cantilever portion; wherein corner portion further comprises sufficient clearance to prevent the apex of the L-shaped section from contacting the corner of the room; wherein the adaptations, corner portion and cantilever portion are a single, integral piece.

9. The hanger arrangement of claim 8 further comprising: an extending member to extend the cantilever portion upwardly and outwardly from about the length of the cantilever portion to almost double the length of the cantilever portion; adaptations to support an object positioned on the distal end of the extending member.

10. A hanger arrangement to support an object in the corner of a room comprising: a bracket, wherein the bracket comprises a corner portion to form to both walls of the inside corner of the room, wherein the corner portion has a substantially L-shaped profile relative to its length, a cantilever portion to support the object, wherein the cantilever portion has a substantially L-shaped profile relative to its length, and a joint to fixedly join the cantilever portion to the corner portion and to align the apex of the L-shaped profiles of the corner portion and the cantilever portion, adaptations, positioned on the distal end of the cantilever portion, to support an object; and a plurality of fasteners to attach the corner portion of the bracket to both walls in the inside corner of the room.

11. The hanger arrangement of claim 10: wherein the arrangement does not comprise any gusset to assist supporting the object.

12. The hanger arrangement of claim 10: wherein corner portion further comprises sufficient clearance to prevent the apex of the L-shaped section from contacting the corner of the room and to prevent damage to the wall finish.

13. The hanger arrangement of claim 10 further comprising: an extending member to extend upwardly and outwardly from the cantilever portion; and adaptations positioned on the distal end of the extending member to support an object.

14. The hanger arrangement of claim 13: wherein the arrangement does not comprise any gusset to assist supporting the object; and wherein corner portion further comprises sufficient clearance to prevent the apex of the L-shaped section from contacting the corner of the room and to prevent damage to the wall finish.

* * * * *